United States Patent [19]

Winston

[11] 4,237,332
[45] Dec. 2, 1980

[54] NONIMAGING RADIANT ENERGY DIRECTION DEVICE

[75] Inventor: Roland Winston, Chicago, Ill.

[73] Assignee: The United States of America as represented by the United States Department of Energy, Washington, D.C.

[21] Appl. No.: 945,923

[22] Filed: Sep. 26, 1978

[51] Int. Cl.³ .................. H01L 31/04; G02B 5/10
[52] U.S. Cl. .................................. 136/259; 136,246; 350/293; 126/439
[58] Field of Search ............ 350/293, 294, 296, 96.10; 126/438, 439; 136/89 CA, 89 PC

[56] References Cited

U.S. PATENT DOCUMENTS

| | | | |
|---|---|---|---|
| 3,899,672 | 8/1975 | Levi-SEtti | 350/293 |
| 3,923,381 | 12/1975 | Winston | 350/293 |
| 3,957,031 | 5/1976 | Winston | 350/293 X |
| 4,003,638 | 1/1977 | Winston | 350/293 |
| 4,045,246 | 8/1977 | Mlavsky et al. | 350/293 X |
| 4,134,392 | 1/1979 | Livermore et al. | 126/439 |

OTHER PUBLICATIONS

Williamson, *Journal of the Optical Society of America*, vol. 42, No. 10, Oct. 1952, pp. 712-715.

*Primary Examiner*—F. L. Evans
*Attorney, Agent, or Firm*—James E. Denny; Frank H. Jackson; Paul A. Gottlieb

[57] ABSTRACT

A raidant energy nonimaging light direction device is provided. The device includes an energy transducer and a reflective wall whose contour is particularly determined with respect to the geometrical vector flux of a field associated with the transducer.

14 Claims, 2 Drawing Figures

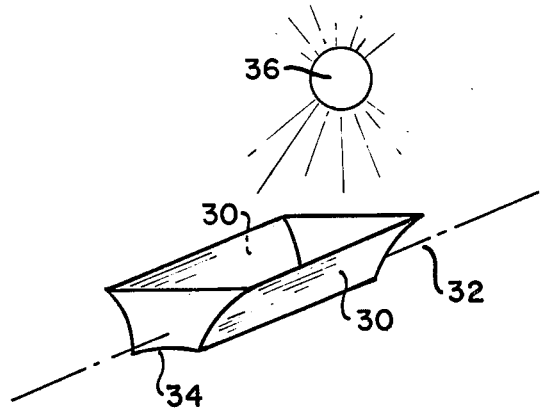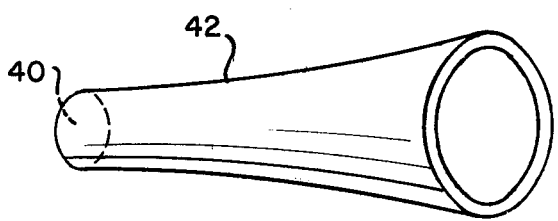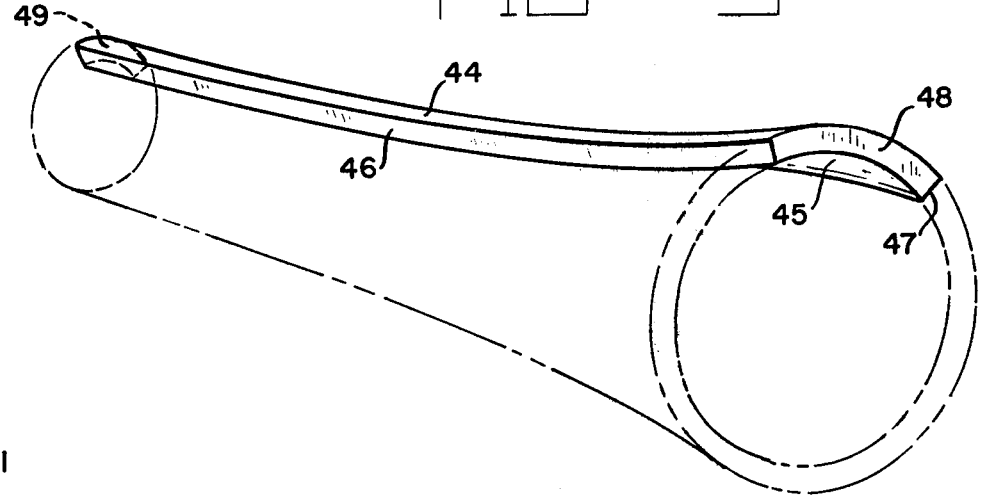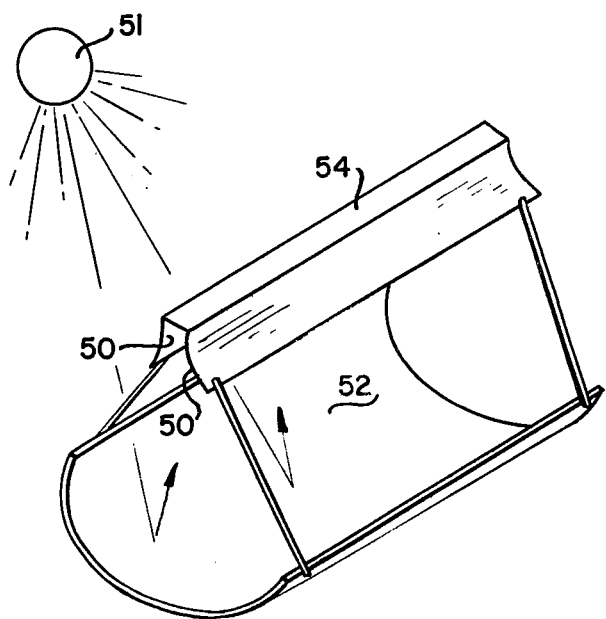

NONIMAGING RADIANT ENERGY DIRECTION DEVICE

CONTRACTURAL ORIGIN OF THE INVENTION

The invention described herein was made in the course of, or under, a contract with the U.S. DEPARTMENT OF ENERGY.

BACKGROUND OF THE INVENTION

A family of nonimaging radiant energy direction devices has been developed and are described in the following references: U.S. Pat. Nos. 3,923,381, 4,002,499, 3,957,031, U.S. Pat. Ser. No. 850,340, U.S. patent application Ser. No. 714,863, and a publication, Applied Optics, Vol. 15, No. 2, Pages 291-292, Feb. 1976. Each of the devices referred to in these references was based on methods of design which utilized techniques of geometric optics, essentially the use of optical ray tracing together with experience about the behavior of reflectors of a variety shapes. The best known examples of this is the compound parabolic concentrator (CPC) described in U.S. Pat. No. 3,923,381.

When used as a second stage concentrator, CPC type devices have a practical disadvantage concerned with guidance of the concentrator system to face the sun. The entry aperture of the CPC is placed at the aberrated sun's image formed by the primary concentrator. Since the image will usually just fill the entry aperture, the system is very sensitive to guidance errors. Guidance errors of 0.1° can cause losses as much as 20% of the flux. If a second stage with an entry aperture larger than the sun's image were used, some concentration is lost and the flux distribution over the exit aperture becomes nonuniform. Nonuniformity of flux distribution is very undesirable with photovoltaic cell arrays or heat absorbers. Thus the CPC type design prescription when applied to a second stage concentrator offers a good but not ideal solution.

There is herein disclosed a new class of nonimaging concentrators, some having maxinumal theoretical concentration, not taught by the above described optical ray tracing methods. The method employs the geometrical vector flux quality of incoherent Lambertian radiant energy emitters. The overall design method can be shown to include those devices referred to in the above references as well as new devices which are particularly suited as second stage concentrators.

It is therefore an object of this invention to provide a radiant energy direction device.

Another object of this invention is to provide radiant energy concentration and collection devices particularly adaptable for the collection of solar energy.

Another object of this invention is to provide radiant energy concentrators particularly suited as second stage concentrators.

SUMMARY

A nonimaging radiant energy light direction device is provided which may be utilized for both the collection and transmission of radiant energy. The device includes an energy transducer and at least one reflective wall of particular contour. The particular contour is determined by assuming the transducer is acting as an incoherent Lambertian radiant energy emitter of finite dimension. The reflective wall is placed along a flow line of the geometrical vector flux associated with such an emitter. The ideal contour will also satisfy the condition that the rays of radiant energy are in a state of detailed balance along the mirror. Both trough shaped and cone like direction devices can be developed from this design method.

DESCRIPTION OF THE DRAWINGS

FIG. 3 is a three dimensional view of a trough shaped radiant energy collection device;

FIG. 4 is a three dimensional view of a cone like radiant energy direction device;

FIG. 5 is a three dimensional view of an asymmetrical cone like radiant energy direction device; and FIG. 6 is a three dimensional view of a trough shaped radiant energy direction device utilized as a second stage collector.

DETAILED DESCRIPTION OF THE PREFERRED EMBODIMENT

The principle on which the design is based depends on a new concept, the geometrical vector flux (vector flux for short). This concept arises from the well-known étendue, U, defined by $$dU = dp_x dp_y dx dy \quad (1)$$

where $p_x$ and $p_y$ are optical direction cosines of rays in a beam of radiation, referred to rectangular coordinate axes x, y, z. The conservation of étendue through a system, expressed by $$SdU = \text{const} \quad (2)$$

leads to the well-known fundamental limit on concentration ratio discovered by Winston (J. Opt. Soc. Amer., (1970) 60 245-247).

If new quantities $J_x$, $J_y$, $J_z$ are defined by $$J_x = S dp_y dp_z$$

$$J_y = S dp_z dp_x$$

$$J_z = S dp_x dp_y \quad (3)$$

it is found that they behave like the components of a vector. This is denoted by $\underline{J} = (J_x, J_y, J_z)$ and is called the geometrical vector flux. An alternate expression for J which explicitely exhibits its vector character is $$\underline{J} = n^2 \int \underline{K} d\Omega \quad (4)$$

where n is the index of refraction, $\underline{K}$ the unit ray direction and $\Omega$ the solid angle.

It is possible to calculate the vector flux field quite easily for certain simple shapes of sources, in particular one can plot the lines of flow of the field, i.e. the loci which are tangent to the direction of $\underline{J}$ at each point. The lines of flow give the general direction of light energy travel within the geometrical optics approximation and they therefore have the property that if a small mirror element is placed in the field so that the lines of flow are in its surface, the flow locally is not disturbed. There are certain particularly simple source shapes such that the rays at any point in the vector flux field are in a state of detailed balance. This means that for each ray striking the above mirror element from one side there is a corresponding ray from the other side in exactly the direction corresponding to the reflected ray. For such a field it is found that a mirror surface can be placed so that it contains the flow lines and there will be no disturbance with the field anywhere, not merely locally. Such mirror shapes are ideal concentrator shapes.

Figure 1:
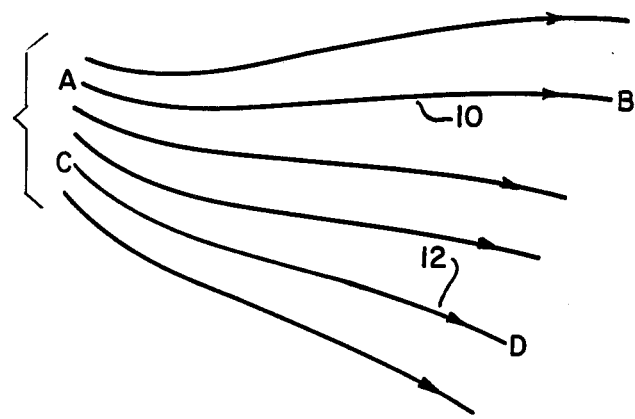
FIG. 1 illustrates flow lines in a radiant energy field.

Referring to FIG. 1 there is shown solenoidal flow lines in a field. The principle of detailed balance implies that if we place mirrored surfaced along flow lines 10 and 12 which extend between points A and B and C and D respectively, the field will be undisturbed. This means that we could reverse the light direction, and send in a beam between BD with the same characteristics, including the same etendue, as the portion of the beam that came out between B and D in the original field, and the corresponding beam would issue from AC. This would constitute a loss free concentrator and if in the original field a full Lambertian beam had entered at BD the concentrator would have the maximum theoretical concentration.

The new method for designing radiant energy direction devices therefore requires that one start with a vector field from an effective or assumed Lambertian radiator and then construct the radiant energy director by placing a mirror or mirrors along flow lines. If the rays in the field are in detailed balance the concentrator thereby obtained will be ideal. The mirror for practical purposes is reflective only on one side and therefore may be formed in any of a variety of means including metal walls, refractive boundaries, etc.

Figure 2:
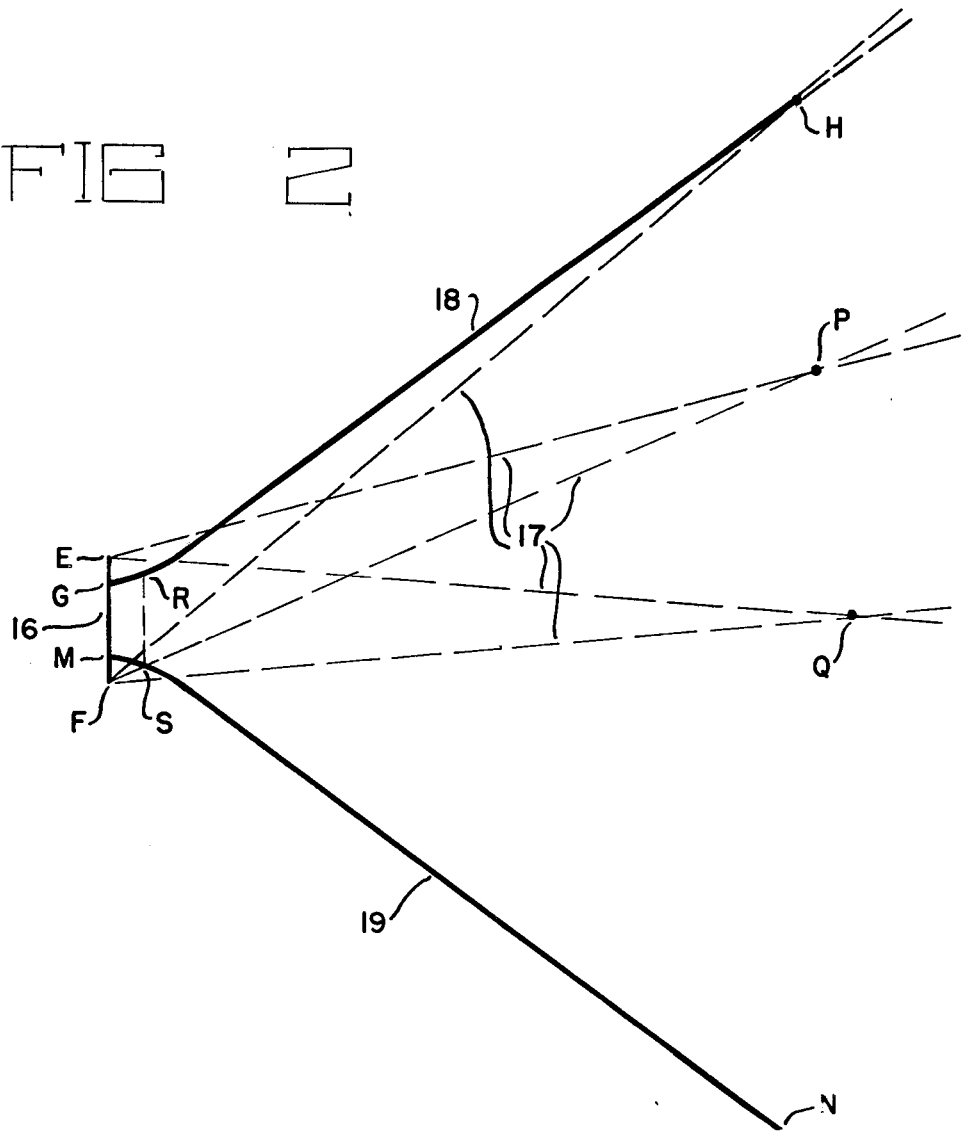
FIG. 2 shows the transverse cross section of a radiant energy direction device.

To illustrate the design principle, referring to FIG. 2, in two dimensional geometry, consider that portion 16 of an infinite strip which extends between points E and F and acts as a uniform Lambertian source. Portion 16 is of width 2c. The flow lines of the vector flux $\underline{J}$ are confocal hyperbolas with foci at E and F and we can place mirrors 18 and 19 along any of these confocal hyperbolas without disturbing the flow. Thus suppose we select the pair of hyperbolas GH and MN, which, for example, start from points on the source EF distance 0.6 c from the centre. Then from the elementary geometry of the hyperbola, any ray through H aimed at a point between E and F will, after zero, one, or a multiple number of reflections, reach the source 16 between G and M, and no ray through H aimed outside EF can reach the source 16. Typical extreme rays 17, through points P and Q in the entry aperture are shown. Thus the system is an ideal nonimaging concentrator which takes all rays converging to the virtual source EF (within certain angular ranges determined by the position of the points H and N with respect to points E and F) and sends them to points in GM.

In order to define the mode of action of the new concentrator more clearly, since it is so different from the CPC, we may say that it operates with a real entry aperture HN and a virtual source EF; thus typical extreme rays through different points in the entry aperture HN would be as in FIG. 2. Note that the CPC design takes all rays incident between HN within a given angle and directs them to GM, whch contrasts with the new design which takes all rays incident between HN and directed to EF, and directs them to GM. The concentration obtained with the new design is dependent upon the length of mirrors 18 and 19 with respect to the distance between the actual source and the virtual source EF.

We note also that the outside surfaces if reflecting would also act as concentrators, taking rays incident on the outside surfaces 18 and 19 directed at the strip EF and concentrating them into the areas between G and E, and M and F.

We note also that the physical absorber or source may be located in a position different from the virtual Lambertian radiator, for example at RS in FIG. 2. This may be advantageous in reducing the number of reflections or saving mirror area with little loss of effective concentration. This is analogous to truncation of CPC type designs.

In designing two dimensional or trough shaped collectors it is simply necessary to assume that the desired energy absorber is acting as an effective Lambertian radiator and to assume a flow pattern which can be associated with the geometry of such an effective radiator. Mirrors are then positioned along the flow lines of the assumed pattern so that they terminate at the edge points of the desired entrance aperture. There are a plurality of potential designs which will achieve ideal concentration. For example, if a flat energy absorber is assumed to be radiating effectively as if the flat surface is joined to infinitely long sides to form a truncated wedge the flow pattern will be a plurality of parabolas which coincide exactly with the parabolic design disclosed in the CPC patent previously referred to. Similarily all the other designs developed by the optical techniques previously referred to in the prior art references can be matched up to effective Lambertian radiators having infinitely long sides. The new class of concentractors herein disclosed are those whose receivers are effective Lambertian radiators which radiate as though they were a source of finite dimension. In this way we distinguish over the previous designs disclosed in the before mentioned references. It should be noted that in a practical sense the CPC type collectors are generally preferred for most applications because they achieve maximum concentration with fewer average number of reflections.

The two dimensional concentrator configuration can be utilized in a practical device as shown in FIG. 3. Here the side wall contours 30 are extended parallel to an axis 32 to form a trough shaped device. An energy transducer 34 which might be, for example, an array of photovoltaic cells is placed at the bottom of the trough and on it is directed by walls 30 energy from the sun 36. Note also in the embodiment transducer 34 is not flat but convex. The principle of the involute to direct energy to the shaded portion of an absorber coupled with an upper portion reflector as describes in U.S. Pat. No. 4,002,499 is also applicable with this design.

Three dimensional concentrators, i.e. cone shaped concentrators, utilizing the CPC type design do not have the maximum theoretical concentration ratio since a small portion of the incoming rays at and near the extreme acceptance angles are always turned back after multiple reflections. Can the new design principle be applied to three dimensional direction devices?

Referring to FIG. 4 there is shown an effective Lambertian finite dimension disc radiator 40. As in the two dimensional case the radiator exhibits a geometrical vector flux. A cone or trumpet shaped reflector 42 corresponding to lines of flow which intersect the perimeter of disc 40 is utilized as the direction element. For the highly symmetric case of the disk, the three dimensional flux flow surface is the rotated two dimensional hyperbolic profile of FIG. 2. Moreover, the detailed balance condition is satisfied. Therefore the hyperbolic cone is ideal. Of course, for practical reasons already mentioned, it may be advantageous to locate the physical disk somewhat closer to the entry aperture than the theoretical disk 40.

In the three dimensional case, one is not restricted to symmetrical structures. This offers great possibilities for design since there is a great variety of surfaces which contain flow lines. For example, as shown in FIG. 5, by taking two concentric flow lines 44 and 45 and two meridional planes 46 and 47 we could form an ideal concentrator with quasal rectangular entrance 48 and exit 49 apertures and circular acceptance cone, a device which could have applications in spectroscopy and other fields.

It should be noted that merely rotating an ideal two dimensional profile about an axis does not necessarily produce the ideal three dimensional system. This is not so because depending upon the shape at the effective radiator when the two dimensional flow profile is rotated to form a cone the rays may no longer comply with the condition of detailed balance and because the lines of flow may differ from the two dimensional case. For example, for the truncated wedge with infinite sides which gives rise to the CPC, as described above, if rotated to form a frustrated cone, the lines of flow for the frustrated cone are not merely the lines of flow of the wedge rotated. To provide the proper design for these cases, for example the CPC, one must determine what in fact are the flow lines for the cone by numerical methods since they are not the simple curves, i.e., parabolas, of the two dimensional case. The method is essentially to evaluate the integral of equation (1) by transfering the view of the effective radiator as seen from a chosen point in space to what may be called direction cosine space. We may then use equation (3) or equivalently equation (4) to determine the lines of flow of $\underline{J}$.

The surface through the flow lines starting from the edge of the radiator which for the CPC is the infinite frustrated cone then gives a new shape, different from the three dimensional CPC but starting and finishing at the same circles for given concentration ratio and entrance angle. This three dimensional concentrator cannot have ideal concentrations since it is not ideal for the meridian rays, only the CPC shape does that. However, it has been designed around the flow defined by all rays, skew and meridian, and since the meridian rays form a set of zero étendue the three dimensional flow concentrator will approach more nearly than the CPC to the theoretical maximum concentration ratio.

A particular area wherein the new designs have advantages over the CPC type designs is where the collector is utilized as a secondary receiver since the receiver will then be very close to the actual source. Using a CPC or similar devices as a second stage concentrator, as shown in U.S. Pat. No. 3,957,031, has a practical disadvantage concerned with guidance of a concentrator system to face the sun as described previously.

Utilizing the new principle of design, we can devise a concentrator which does not suffer from these problems. The concentrators shown in FIG. 2 and FIG. 4 can operate as improved second stage concentrators. Consider the strip or flat absorber shown in FIG. 2 used as a second stage concentrator of FIG. 6. The flow lines of the vector flux $\underline{J}$ are confocal hyperbolas as previously described. We place mirrors 50 along any of these lines without disturbing the flow. This hyperboloid concentrator fits very well into the requirement for a second stage concentrator. It is used with the image of the sun 51 from the primary collector 52 focused at the plane of the strip 54. Thus the entrance aperture is very much larger than the sun's image and a given error in guiding causes much less loss of flux than with a CPC as second stage. Furthermore, a large proportion of the rays reach the exit aperture after more than one reflection. While this may be a disadvantage if the reflection losses are critical it is an advantage in that more reflections in a nonimaging concentrator tend towards a more uniform distribution of flux in the exit aperture when the entrance aperture is not completely filled, a very desirable feature.

In FIG. 6, take as an example a two meter focal length parabola as first stage concentrator 52, with convergence angle $\pm 30$ degrees, i.e. nominal F/1. This produces an image of the sun 20 mm in diameter, so that our base strip 54 or virtual source EF of FIG. 2 for the hyperboloids is 20 mm in width. We now have some choice of which hyperboloid to use. Consider two possible hyperboloids, starting at 12 and 11 mm width respectively. As is to be expected, the 12 mm hyberbola meets the extreme ray earlier giving a shorter concentrator, but it has the lower concentration ratio. Also to reach exactly the concentration ratio of 2 required to bring the whole system up to theoretical maximum concentration would require an infinitely long concentrator. However, we have ignored the aberrations of the parabola and clearly it makes practical sense only to make the second stage long enough to keep its losses comparable to those of the first stage.

We note that the above two dimensional considerations are applicable to the three dimensional case wherein the primary is a paraboloidal dish and the second stage the hyperboloidal trumpet cone of FIG. 4. Moreover, using a lense as primary focusing element in place of a mirror produces useful configurations in both two and three dimensions.

In plotting flow lines from sources such as the frustrated cone or flat surfaces joined to infinite planes we are not restricted to full Lambertian radiators. Useful results may be obtained by assuming sources which radiate according to Lambert's law only within a restricted angle $\theta < \pi/2$ to the normal and do not radiate outside this. This leads, e.g., to the CPC for restricted exit angle, as described in U.S. patent application Ser. No. 850,340 and, by suitable choice of the flow lines, rectangular and other apertures can be made as nearly ideal concentrators.

It should also be noted that the flow lines obey their own law of refraction different from Snell's law which, for example, has been determined in two dimensions to be $$n \sin (\theta \pm u) = n' \sin (\theta' \pm u') \quad (5)$$

where $|\underline{J}| = 2n \sin u$, $|\underline{J}'| = 2n' \sin u'$, $\theta$ and $\theta$ are the angles between flow line and normal at the two sides of the interface, and n, n' the respective refractive indices.

One accommodates this into the design just as was done with the CPC type designs, as shown for example in U.S. patent application No. 714,863.

The design principles herein disclosed are applicable to considerations of multiple transducers (i.e. multiple effective radiators). One establishes the lines of flow by summing the vector fields associated with each transducer. The summing of fields may be with equal weight or unequal weight.

The embodiments of the invention in which an exclusive property or privilege is claimed are defined as follows:

1. A device for directing and transducing energy comprising: an energy transducer, a first reflective wall of a particular contour, which contour coincides with nonlinear lines of flow of geometrical vector flux of a virtual radiant energy emitter of finite dimension radiating according to Lambert's law within a restricted angle not greater than 90 degrees were said virtual emitter positioned to coincide with said transducer.

2. The device of claim 1 wherein said virtual radiant energy emitter radiates within a restricted angle equal to 90 degrees.

3. The device of claim 1, wherein said energy transducer is an energy absorber.

4. The device of claim 3, further including a second reflective wall whose contour lies along a second line of flow of geometrical vector flux, said second wall being opposed to said first wall.

5. The device of claim 4, wherein said energy absorber has a linear contour.

6. The device of claim 5, wherein the contour of each of said walls is an hyperbola each of whose focus is at one end of said linear absorber.

7. The device of claim 6, wherein the contours of said walls and said absorber are extended parallel to an axis to form a trough-like structure.

8. The device of claim 4, wherein said walls and said absorber are symmetrical and are rotated about an axis to form a trumpet-like structure.

9. The device of claim 4, wherein said walls and said absorber are asymmetrical and are rotated about an axis to form a partial section of a trumpet-like structure.

10. The device of claim 3, further including a primary energy source directing energy to said device.

11. A device for collecting radiant energy from a source, comprising:
    an energy absorber of particular contour, a first reflective wall of a particular contour coinciding with a non-linear line of flow of the geometrical vector flux of a virtual radiant energy emitter, were said absorber positioned between said virtual emitter and said source.

12. The device of claim 11, further including a second wall whose contour lies along another line of flow of said geometrical vector flux.

13. The device of claim 12, wherein said contours of said absorber and said walls are extended parallel to an axis to form a trough like structure.

14. The device of claim 11 where said contours of said absorber and said wall are rotated about an axis to form a trumpet-like structure.

* * * * *